United States Patent
Kinne et al.

(10) Patent No.: US 9,764,820 B2
(45) Date of Patent: Sep. 19, 2017

(54) HORIZONTAL TAIL SURFACE

(71) Applicant: X Development LLC, Mountain View, CA (US)

(72) Inventors: Peter Kinne, Alameda, CA (US); Damon Vander Lind, Alameda, CA (US); Gregor Cadman, Oakland, CA (US)

(73) Assignee: X Development LLC, Mountain View, CA (US)

( * ) Notice: Subject to any disclaimer, the term of this patent is extended or adjusted under 35 U.S.C. 154(b) by 70 days.

(21) Appl. No.: 14/587,683

(22) Filed: Dec. 31, 2014

(65) Prior Publication Data
US 2015/0375847 A1 Dec. 31, 2015

Related U.S. Application Data

(60) Provisional application No. 62/019,412, filed on Jun. 30, 2014.

(51) Int. Cl.
*B64C 5/16* (2006.01)
*B64C 39/02* (2006.01)
*F03D 5/00* (2006.01)

(52) U.S. Cl.
CPC .............. *B64C 5/16* (2013.01); *B64C 39/022* (2013.01); *F03D 5/00* (2013.01); *F05B 2240/40* (2013.01);
(Continued)

(58) Field of Classification Search
CPC . B64C 5/16; B64C 39/022; F03D 5/00; Y02E 10/70; F05B 2240/921
(Continued)

(56) References Cited

U.S. PATENT DOCUMENTS 4,251,040 A * 2/1981 Loyd ..................... B64C 39/022
244/1 R
8,109,711 B2 * 2/2012 Blumer .................... B64B 1/50
415/121.3
(Continued)

OTHER PUBLICATIONS

International Searching Authority, International Search Report and Written Opinion for PCT/US2015/034023 mailed Aug. 28, 2015, 16 pages.
(Continued)

*Primary Examiner* — Timothy D Collins
*Assistant Examiner* — Keith L Dixon
(74) *Attorney, Agent, or Firm* — McDonnell Boehnen Hulbert & Berghoff LLP.

(57) ABSTRACT

An aerial vehicle including a fuselage, a main wing attached to the fuselage, a support structure extending upwardly from the fuselage and having a front surface facing the main wing, an overhang positioned on a top of the support structure and extending towards the main wing, one or more rotating actuators positioned on the overhang, a rear elevator attached to the one or more rotating actuators that are configured to move the rear elevator from a flying mode position where a leading edge of the rear elevator faces the main wing to a hover mode position where the major surfaces of the rear elevator faces the main wing, and wherein the major surfaces of the rear elevator remain in front of the front surface of the support structure when the rear elevator is moved from the flying mode position to the hover mode position.

8 Claims, 10 Drawing Sheets

(52) U.S. Cl.
CPC ... *F05B 2240/917* (2013.01); *F05B 2240/921* (2013.01); *Y02E 10/70* (2013.01); *Y02E 10/728* (2013.01)

(58) Field of Classification Search
USPC .......................................................... 244/48
See application file for complete search history.

(56) References Cited

U.S. PATENT DOCUMENTS

| | | | | |
|---|---|---|---|---|
| 8,350,403 | B2* | 1/2013 | Carroll | B64C 39/022 290/44 |
| 8,888,049 | B2 | 11/2014 | Vander Lind | |
| 9,366,225 | B2* | 6/2016 | Milanese | F03D 5/00 |
| 9,422,918 | B2* | 8/2016 | Lind | F03D 7/0204 |
| 9,429,954 | B2* | 8/2016 | Chubb | B64C 17/00 |
| 2010/0013226 | A1 | 1/2010 | Blumer et al. | |
| 2010/0230546 | A1 | 9/2010 | Bevirt et al. | |
| 2010/0295303 | A1 | 11/2010 | Lind et al. | |
| 2011/0260462 | A1* | 10/2011 | Vander Lind | A63H 27/002 290/55 |
| 2012/0104763 | A1 | 5/2012 | Lind | |
| 2012/0145834 | A1 | 6/2012 | Morgan et al. | |
| 2013/0134261 | A1* | 5/2013 | Goldstein | F03D 9/002 244/155 A |
| 2013/0221679 | A1 | 8/2013 | Vander Lind | |
| 2014/0061368 | A1 | 3/2014 | Karim | |
| 2015/0184629 | A1* | 7/2015 | Vander Lind | F03D 9/002 416/131 |
| 2015/0225080 | A1* | 8/2015 | Bormann | B64C 31/06 244/155 A |
| 2015/0375852 | A1* | 12/2015 | Hallamasek | F03D 13/20 244/175 |

OTHER PUBLICATIONS

Aladin, Daylight and IR Sensory and Mini-UAV System, 2 pages, pre-2014.

* cited by examiner

HORIZONTAL TAIL SURFACE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine (AWT).

SUMMARY

An aerial vehicle is provided that includes a main wing, a fuselage, and a rear elevator secured to a support structure extending upwardly from the fuselage. The rear elevator has a leading edge that faces the main wing when the aerial vehicle is in a flying mode and is also operable in a second hover mode where the rear elevator is rotatable approximately 90 degrees so that a major surface of the rear elevator faces the main wing when the aerial vehicle is in hover mode. The rear elevator is attached to an overhang on the support structure that extends towards the main wing. When the rear elevator is moved into the hover mode, both major surfaces of the rear elevator are positioned in front of a front surface of the support structure so that the leading edge of the rear elevator extends continuously from one end to the other with no cutout in the leading edge required to provide clearance from the support structure.

In another aspect, an airborne wind turbine system is provided including an aerial vehicle having a fuselage and a main wing, an electrically conductive tether having a first end secured to the aerial wing and a second end secured to a ground station, a plurality of power generating turbines connected to the main wing, a support structure extending upwardly from the fuselage, the support structure having a front surface facing the main wing, an overhang positioned on a top of the support structure and extending towards the main wing, one or more rotating actuators positioned on the overhang, a rear elevator having a leading edge and a trailing edge and having a first major surface disposed opposite of a second major surface, the rear elevator attached to the one or more rotating actuators, wherein the one or more rotating actuators are configured to move the rear elevator from a flying mode position where the leading edge of the rear elevator faces the main wing to a hover mode position where the first major surface of the rear elevator faces the main wing, and wherein the leading edge of the rear elevator remains in front of the front surface of the support structure when the rear elevator is moved from the flying mode position to the hover mode position.

In a further aspect, an aerial vehicle is provided including a fuselage, a main wing attached to the fuselage, a support structure extending upwardly from the fuselage, the support structure having a front surface facing the main wing, an overhang positioned on a top of the support structure and extending towards the main wing, one or more rotating actuators positioned on the overhang, a rear elevator having a leading edge and a trailing edge and having a first major surface disposed opposite of a second major surface, the rear elevator attached to the one or more rotating actuators, wherein the one or more rotating actuators are configured to move the rear elevator from a flying mode position where the leading edge of the rear elevator faces the main wing to a hover mode position where the first major surface of the rear elevator faces the main wing, and wherein the first and second major surfaces of the rear elevator remain in front of the front surface of the support structure when the rear elevator is moved from the flying mode position to the hover mode position.

In another aspect, an airborne wind turbine system is provided including an aerial vehicle having a fuselage and a main wing, an electrically conductive tether having a first end secured to the aerial wing and a second end secured to a ground station, a plurality of power generating turbines connected to the main wing, a support structure extending upwardly from the fuselage, the support structure having a front surface facing the main wing, one or more rotating actuators positioned on a top of the support structure, a rear elevator having a leading edge and a trailing edge and having a first major surface disposed opposite of a second major surface, the rear elevator attached to the one or more rotating actuators, wherein the one or more rotating actuators are configured to move the rear elevator from a flying mode position where the leading edge of the rear elevator faces the main wing to a hover mode position where the first major surface of the rear elevator faces the main wing, and wherein the rear elevator has a main spar that is positioned in front of the one or more rotating actuators such that a center of rotation of the rear elevator is positioned behind the main spar of the rear elevator at the point of attachment to the one or more rotating actuators.

In another aspect, a means for aligning a center of rotation of a rear elevator with a center of mass of the rear elevator is provided. Further, means for providing a continuous leading edge of a rear elevator are provided. In addition, means for positioning the major surfaces of a rear elevator in front of a support structure are provided when an aerial vehicle is in a hover mode. In a further aspect, means for conforming a rear cutout to a support structure are provided.

These as well as other aspects, advantages, and alternatives, will become apparent to those of ordinary skill in the art by reading the following detailed description, with reference where appropriate to the accompanying drawings.

DETAILED DESCRIPTION

Figure 1:
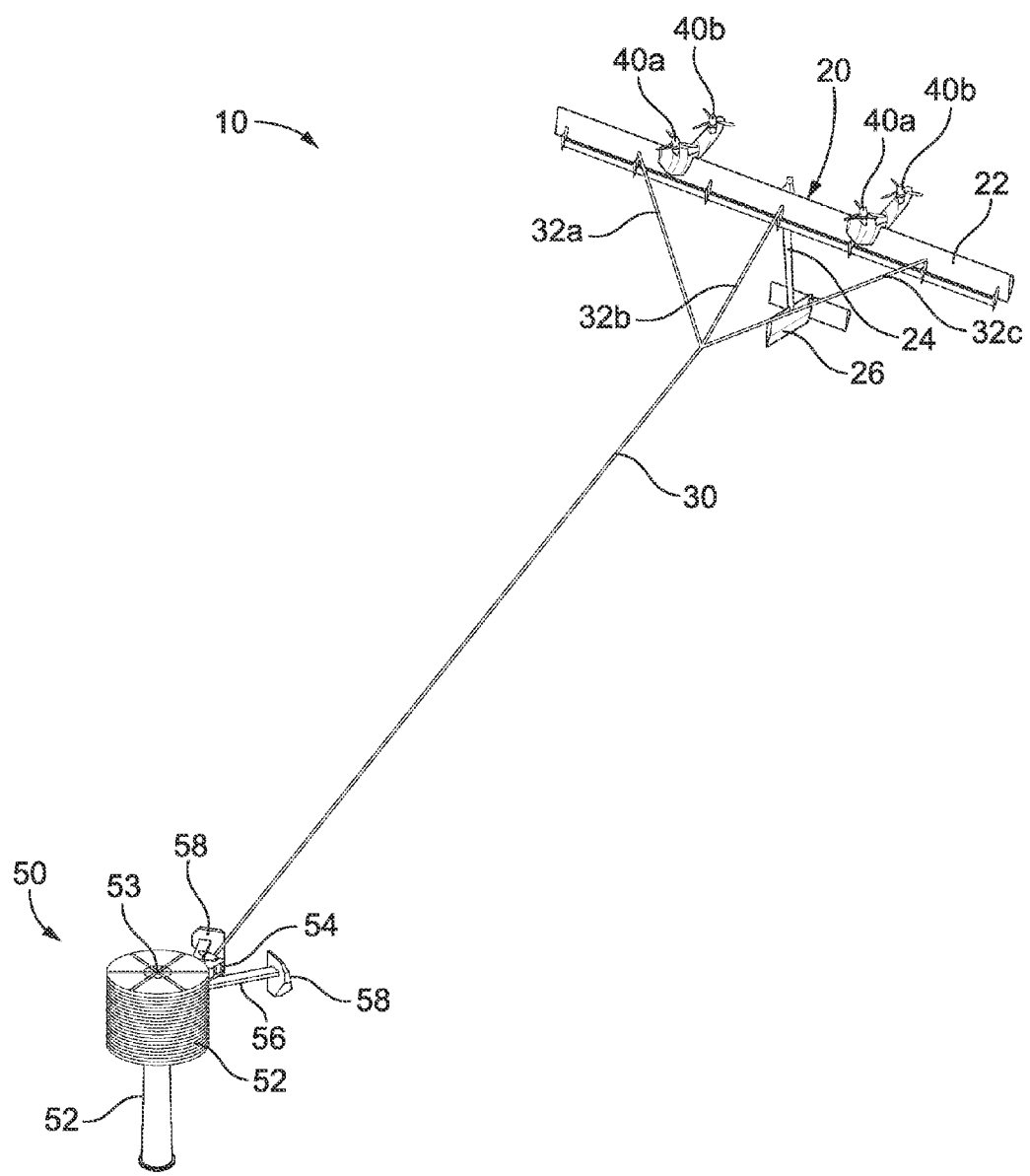
FIG. 1 is a perspective view of an airborne wind turbine 10 including aerial vehicle 20 attached to a ground station 50 with an electrically conductive tether 30, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments relate to aerial vehicles, which may be used in a wind energy system, such as an Airborne Wind Turbine (AWT). In particular, illustrative embodiments may relate to or take the form of methods and systems using an airborne vehicle that is attached to a ground station using an electrically conductive tether.

Wind energy systems, such as an AWT, may be used to convert wind energy to electrical energy. An AWT is a wind based energy generation device that may include an aerial vehicle constructed of a rigid wing with mounted turbines. The aerial vehicle may be operable to fly in a path across the wind, such as a substantially circular path above the ground (or water) to convert kinetic wind energy to electrical energy. In such cross wind flight, the aerial vehicle flies across the wind in a circular pattern similar to the tip of a wind turbine. The rotors attached to the rigid wing may be used to generate power by slowing the wing down. In particular, air moving across the turbine blades may force the blades to rotate, driving a generator to produce electricity. The aerial vehicle may also be connected to a ground station via an electrically conductive tether that transmits power generated by the aerial vehicle to the ground station, and on to the grid.

When it is desired to land the aerial vehicle, the electrically conductive tether is wound onto a spool or drum in the ground station and the aerial vehicle is reeled in towards a perch on the ground station. Prior to landing on the perch, the aerial vehicle transitions from a flying mode to a hover mode. The drum is further rotated to further wind the tether onto the drum until the aerial vehicle comes to rest on the perch.

A rear elevator may be used to assist with flight control of the aerial vehicle (e.g., pitch). In particular, a rear elevator, sometimes referred to as a tail wing or horizontal tail, may be mounted on a support structure (e.g., a tail) extending upwardly from the rear of the fuselage. The support structure may also house a rudder that may be used for flight control (e.g., yaw).

During normal forward flight while the aerial vehicle is in a flying mode, the rear elevator has a leading edge that faces the main wing, such that the major surfaces of the rear elevator are generally perpendicular to the support structure. When the aerial vehicle transitions to a hover mode, the rear elevator is moved approximately 90 degrees so that the main upper surface of the rear elevator faces the main wing, rather than having the leading edge of the rear elevator facing the main wing, such that the major surfaces of the rear elevator are generally parallel to the support structure.

A pair of rotating actuators may be mounted to the top of the support structure and secured to the rear elevator to effect movement of the rear elevator when transitioning from flying mode to hover mode, and vice versa. The rotating actuators may be, for example, servo motors, or bearing systems and hydraulic linear actuators, or other means for rotating the elevator.

In a prior design (shown in FIGS. 5-8), a transverse structural spar of the rear elevator was positioned behind the rotating actuators (illustrated as servo motors). A large cutout in the leading edge of the rear elevator in front of the spar (between the forwardly extending counterweights) was required so that the support structure and rotating actuators would not interfere with the rear elevator when moving into or out of hover mode.

Similarly, a large cutout behind the spar of the rear elevator was required so that the top portion of the support structure would not interfere with the rear elevator when moving into or out of a hover mode. Furthermore, the rear cutout also had to be widened to accommodate movement of the top of the rudder so that there would be no interference between the rear elevator and the rudder during movement of the rudder.

In the prior design, the rear elevator had a center of aerodynamic force where the rotating actuators were located. However, the spar of the rear elevator carries beam and torsion load across the middle of the rear elevator, with the spar being located behind the rotating actuators. As a result, there was a problem with the inertial balancing of the rear elevator. Because a major part of the mass of the rear elevator was in the spar structure, the center of mass of the rear elevator was positioned behind the center of rotation of the rear elevator. When the aerial vehicle experienced an upward perturbation during flight, the inertia of the rear elevator could tilt it upwards causing a positive feedback loop of pitch oscillations that would adversely affect control of the aerial vehicle. Counterweights (shown forwardly extending from the leading edge of the rear elevator) were provided that extended in front of the leading edge of the rear elevator to move the center of mass of the rear elevator closer to the center of rotation of the rear elevator.

The prior design included a number of drawbacks including the undesirable added weight of the counterweights, and the aerodynamic inefficiencies caused by both the large cutout in the leading edge of the rear elevator in front of the spar and the large cutout behind the spar to eliminate interference from the support structure and the rudder. It would be desirable to provide a rear elevator that eliminated or reduced the drawbacks associated with the prior design.

In an example embodiment (shown below in FIGS. 9-15), an aerial vehicle is provided having a support structure upwardly extending from a rear of the fuselage of the aerial vehicle. An overhang extends from the top of the support structure extending in a direction towards the main wing of the aerial vehicle. A pair of rotating actuators for rotating the rear elevator are secured to the overhang. In this embodiment, the rotating actuators are also attached to the rear elevator in a hollow portion of the rear elevator at a position that is behind the spar of the rear elevator. The positioning of the rotating actuators on the overhang of the support structure advantageously provides for no interference between the rear elevator and the support structure when the rear elevator transitions to and from hover mode. In particular, when the rear elevator is rotated into a hover mode (shown in FIGS. 12-15), both of the main surfaces of the rear elevator are positioned in front of the front surface of the support structure. Therefore, there is no interference between the support structure and the rear elevator because it is attached to the overhang in front of the support structure.

This configuration advantageously allows the leading edge of the rear elevator to extend continuously from one end of the rear elevator to the other, because no front cutout in the leading edge of the rear elevator is needed to provide clearance from the support structure or the rotating actuators when the rear elevator transitions to and from a hover mode. A continuously extending leading edge on the rear elevator provides significant improvements in the aerodynamics of the rear elevator in comparison to the prior design where the front surface had a large cutout to accommodate interference with the support structure and rotating actuators.

In addition, the aerodynamic center is the point on the main wing where the incremental lift due to change in the angle of attack will act. In the present embodiments, the rotating actuators are positioned behind the spar, and a rotation point of the rotating actuators may be advantageously placed at the aerodynamic center so that forces on the rotating actuators are low. In particular, because the lift force generated due to change of angle of attack passes through the aerodynamic center, the moment generated about this point will be zero, resulting in fewer forces acting on the actuators. Furthermore, with this design with the rear elevator attached to the rotating actuators behind the spar, the center of mass of the rear elevator is more closely aligned with the center of rotation of the rear elevator, thereby eliminating the need for counterweights.

In addition, the present embodiments include a cutout positioned behind the rotating actuators to accommodate for interference with the top of the support structure. However, when the aerial vehicle is the flying mode, there are only small gaps between the cutout and the outer surfaces of the overhang and support structure. During flying mode, the rear elevator has normal flight deflections of +/−15 degrees and the gaps remain essentially closed. As a result, the present embodiments provide significant aerodynamic improvements in normal flying mode over the prior design with the large square cutout that was open even during normal flying mode.

Moreover, because the overhang extends in front of the support structure (and rudder attached at the rear of the support structure), the trailing edge of the rear elevator is positioned in front of the rudder. Therefore, there is no need to provide any additional cutouts in the rear cutout to accommodate movement of the rudder. As a result, the entire rear cutout can closely conform to the outer surfaces of the overhang and support structure. In fact, the trailing edges of the rear cutout on the rear elevator may actually be angled inwardly to follow the contour of the outer surfaces of the overhang and support structure, in contrast to the prior design where the trailing edge of the rear cutout required further cutouts (or increased width) to accommodate movement of the rudder. Providing a rear cutout that closely conforms to the outer surfaces of the overhang and the support structure provides for improved aerodynamics during normal flying mode. Although the rear cutout will be exposed during hover mode, the aerodynamic efficiency of the aerial vehicle is much more important during flying mode where the rear cutout is not exposed.

2. ILLUSTRATIVE AIRBORNE WIND TURBINES

Figure 2:
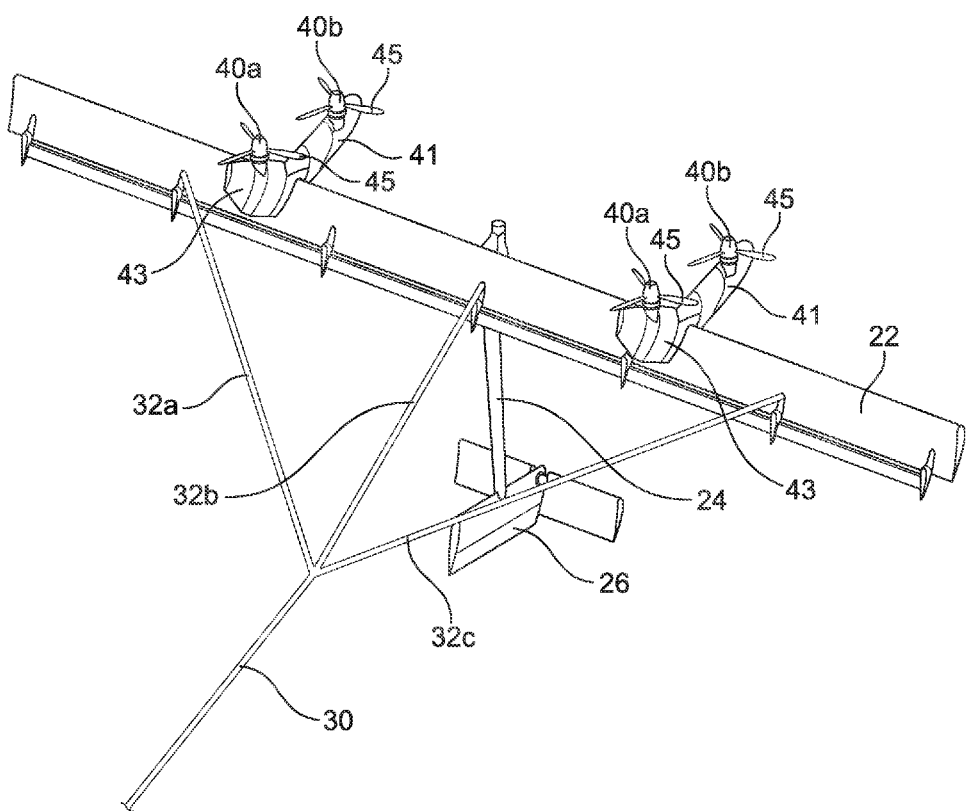
FIG. 2 is a close-up perspective view of aerial vehicle 20 shown in FIG. 1.

As disclosed in FIGS. 1-2, an airborne wind turbine (AWT) 10 is disclosed, according to an example embodiment. AWT 10 is a wind based energy generation device that includes an aerial vehicle 20 constructed of a rigid wing 22 with mounted turbines 40 that flies in a path, such as a substantially circular path, across the wind. In an example embodiment, the aerial vehicle may fly between 250 and 600 meters above the ground (or water) to convert kinetic wind energy to electrical energy. However, an aerial vehicle may fly at other heights without departing from the scope of the invention. In the cross wind flight, the aerial vehicle 20 flies across the wind in a circular pattern similar to the tip of a wind turbine. The rotors 40 attached to the rigid wing 22 are used to generate power by slowing the wing 22 down. Air moving across the turbine blades forces them to rotate, driving a generator to produce electricity. The aerial vehicle 20 is connected to a ground station 50 via an electrically conductive tether 30 that transmits power generated by the aerial vehicle to the ground station 50, and on to the grid.

As shown in FIG. 1, the aerial vehicle 20 may be connected to the tether 30, and the tether 30 may be connected to the ground station 50. In this example, the tether 30 may be attached to the ground station 50 at one location on the ground station 50, and attached to the aerial vehicle 20 at three locations on the aerial vehicle 2 using bridle 32*a*, 32*b*, and 32*c*. However, in other examples, the tether 30 may be attached at multiple locations to any part of the ground station 50 and/or the aerial vehicle 20.

The ground station 50 may be used to hold and/or support the aerial vehicle 20 until it is in an operational mode. The ground station may include a tower 52 that may be on the order of 15 meters tall. The ground station may also include a drum 52 rotatable about drum axis 53 that is used to reel in aerial vehicle 20 by winding the tether 30 onto the rotatable drum 52. In this example, the drum 52 is oriented vertically, although the drum may also be oriented horizontally (or at an angle). Further, the ground station 50 may be further configured to receive the aerial vehicle 20 during a landing. For example, support members 56 are attached to perch panels 58 that extend from the ground station 50.

When the tether 30 is wound onto drum 52 and the aerial vehicle 20 is reeled in towards the ground station 50, the aerial vehicle may come to rest upon perch panels 58. The ground station 50 may be formed of any material that can suitably keep the aerial vehicle 20 attached and/or anchored to the ground while in hover flight, forward flight, or crosswind flight. In some implementations, ground station 50 may be configured for use on land. However, ground station 50 may also be implemented on a body of water, such as a lake, river, sea, or ocean. For example, a ground station could include or be arranged on a floating off-shore platform or a boat, among other possibilities. Further, ground station 50 may be configured to remain stationary or to move relative to the ground or the surface of a body of water.

The tether 30 may transmit electrical energy generated by the aerial vehicle 20 to the ground station 50. In addition, the tether 30 may transmit electricity to the aerial vehicle 20 in order to power the aerial vehicle 20 during takeoff, landing, hover flight, and/or forward flight. The tether 30 may be constructed in any form and using any material which may allow for the transmission, delivery, and/or harnessing of electrical energy generated by the aerial vehicle 20 and/or transmission of electricity to the aerial vehicle 20. The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

The aerial vehicle 20 may include or take the form of various types of devices, such as a kite, a helicopter, a wing and/or an airplane, among other possibilities. The aerial vehicle 20 may be formed of solid structures of metal, plastic and/or other polymers. The aerial vehicle 20 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40a and 40b, tail boom or fuselage 24, and tail wing 26. Any of these components may be shaped in any form which allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the upper rotors 40a to the main wing 22, and rotor connectors 41 may be used to connect the lower rotors 40b to the main wing 22. In some examples, the rotor connectors 43 and 41 may take the form of or be similar in form to one or more pylons. In this example, the rotor connectors 43 and 41 are arranged such that the upper rotors 40a are positioned above the wing 22 and the lower rotors 40b are positioned below the wing 22.

The rotors 40a and 40b may be configured to drive one or more generators for the purpose of generating electrical energy. In this example, the rotors 40a and 40b may each include one or more blades 45, such as three blades. The one or more rotor blades 45 may rotate via interactions with the wind and which could be used to drive the one or more generators. In addition, the rotors 40a and 40b may also be configured to provide a thrust to the aerial vehicle 20 during flight. With this arrangement, the rotors 40a and 40b may function as one or more propulsion units, such as a propeller. Although the rotors 40a and 40b are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 52 is rotated to reel in the aerial vehicle 20 towards the perch panels 58 on the ground station 50, and the electrically conductive tether 30 is wound onto drum 52. Prior to landing on the perch panels 58, the aerial vehicle 20 transitions from a flying mode to a hover mode. The drum 52 is further rotated to further wind the tether 30 onto the drum 52 until the aerial vehicle 20 comes to rest on the perch panels 58.

Figure 3:
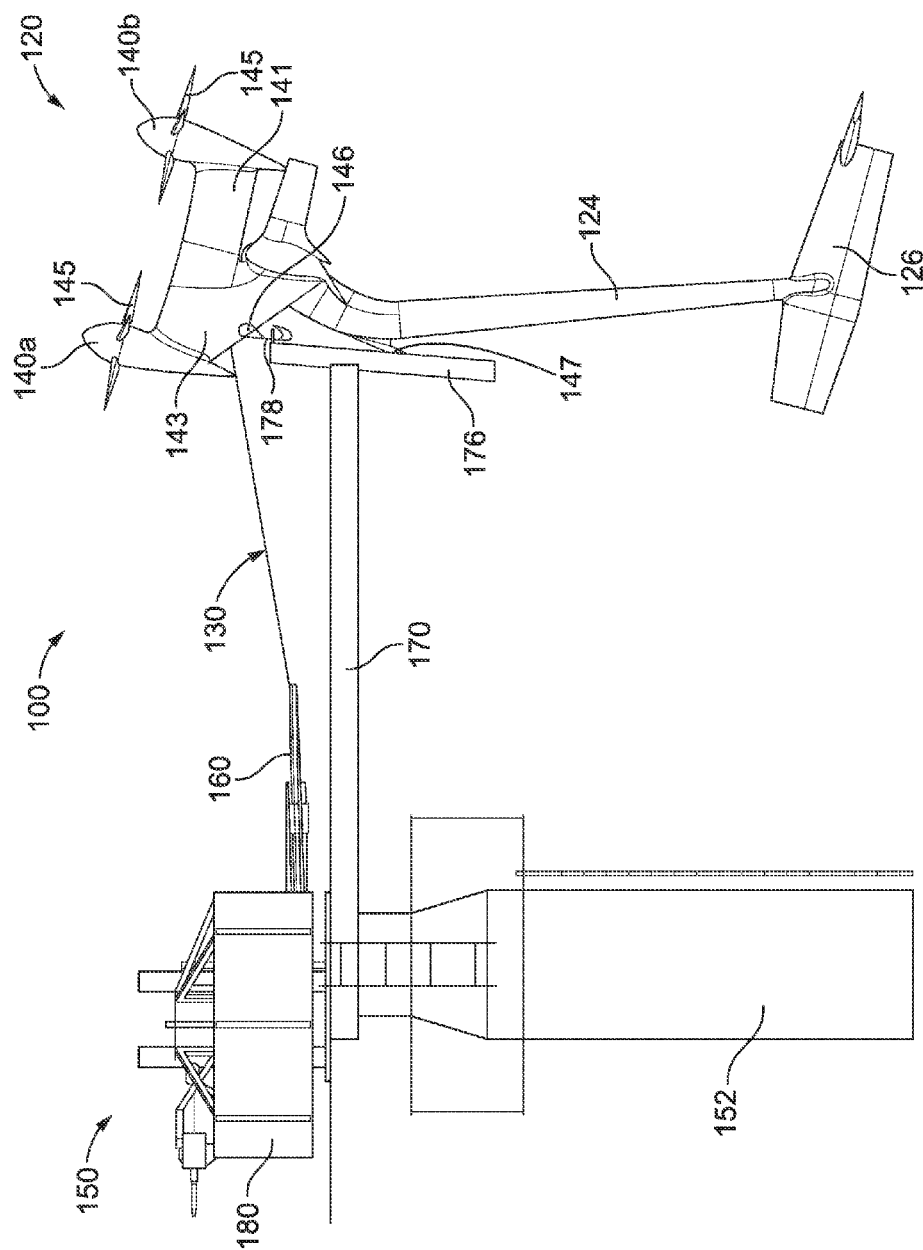
FIG. 3 is a side view of aerial vehicle 120 perched on perch panel 160 attached to ground station 150, according to an example embodiment.
Figure 4:
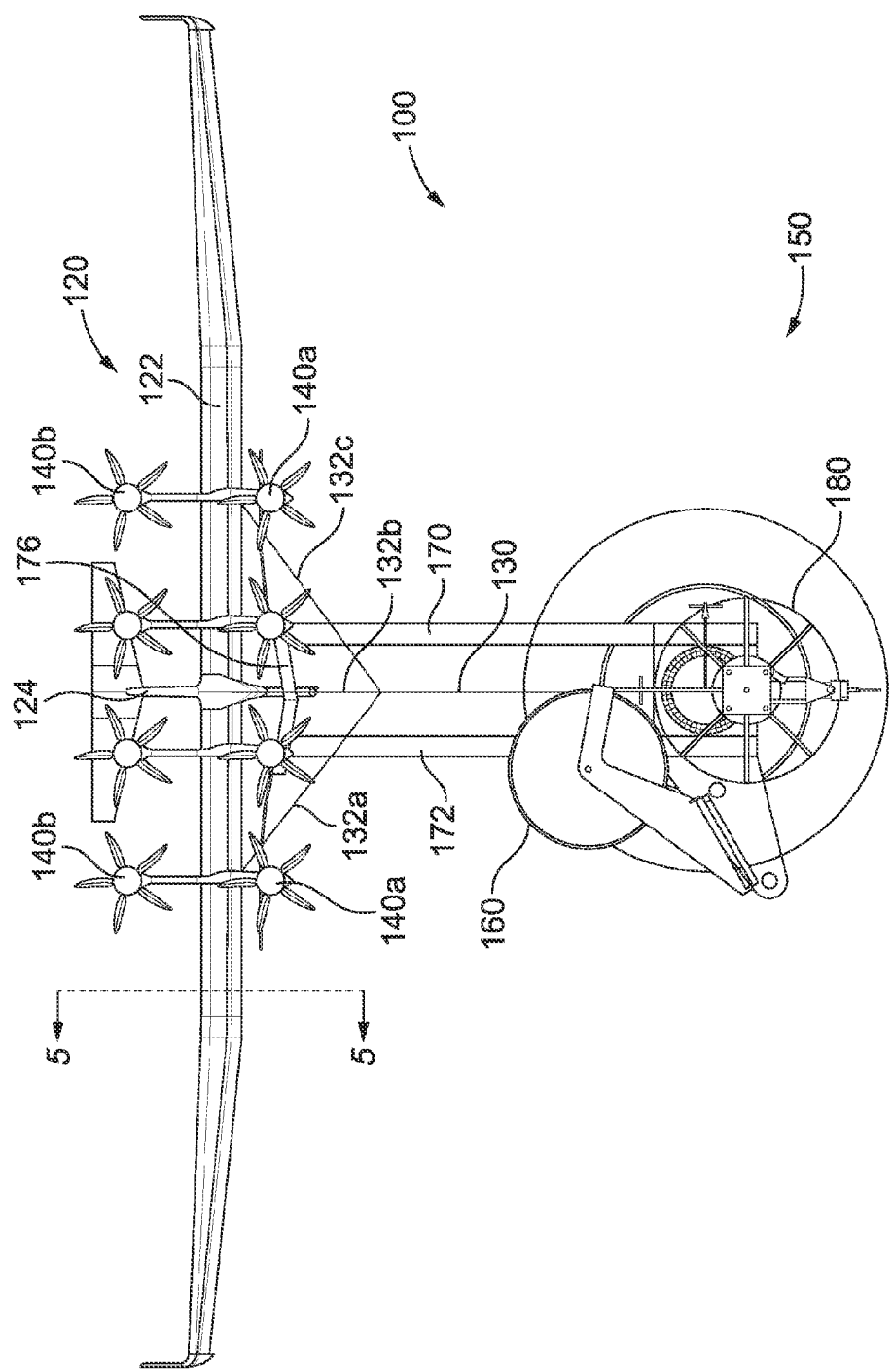
FIG. 4 is a top view of the aerial vehicle 120 and ground station 150 shown in FIG. 3, according to an example embodiment.

FIG. 3 is a side view of an airborne wind turbine including aerial vehicle 120 perched on perch panel 160 attached to ground station 150, and FIG. 4 is a top view of the aerial vehicle 120 and ground station 150 shown in FIG. 3, according to an example embodiment. In FIGS. 3 and 4, ground station 150 includes a tower 152 upon which rotatable drum 180 and levelwind 182 are positioned. In an embodiment, the tower 152 may be 15 meters in height. An electrically conductive tether 130 extends from the levelwind and is attached to wing 122 of aerial vehicle 120 using bridle lines 132a, 132b, and 132c. In one embodiment the bridle lines 132a, 132b, and 132c may be attached at asymmetric locations along the span of the wing 122, such that the inboard side of wing 122 has the bridle attached further from the wingtip, and the outboard side of the wing 122 has the bridle attached closer to the outboard wingtip. Such an asymmetric configuration allows the bridle lines 132a and 132c to better clear a larger sized perch panel.

The perch panel 160 is supported by perch panel support members 170a and 170b that extend horizontally from a perch platform 172 positioned on the ground station 150. The perch panel platform 172 may rotate about the top of the tower 52 so that the perch panel 160 is in proper position when the aerial vehicle is 120 is landing. Aerial vehicle 120 includes lower rotors 140a mounted on pylons 143 attached to wing 122 and upper rotors 140b mounted on pylons 143 attached to wing having propellers 145. In an embodiment, wing 122 is 4 meters long. Aerial vehicle includes a fuselage 124 having a curved section 129 to which a peg 28 is attached. In a perched condition, as shown in FIGS. 3 and 4, peg 28 contacts perch panel 160 constructed of a first side 160a and a second side 160b.

Furthermore, when the aerial vehicle 120 is in hover mode during landing, the peg 128 extends downwardly and outwardly from the fuselage 124 towards the perch panel 160. As shown in FIG. 4, the perch panel 160 may be aligned with the tether 130 being guided through levelwind 182 and onto a rotatable drum 180 that rotates about an axis 184 on ground station 150. In this manner, the perch panel 160 faces the fuselage 124 of the aerial vehicle 120 when it is landing.

The drum 180 shown in FIGS. 3 and 4 has a vertical axis of rotation 184. However a horizontal drum or an angled drum could also be used. For example, if a drum rotatable about a horizontal axis is used, the perch platform 172 could be coupled to the drum such that the perch platform 172 extends perpendicularly from the axis of the drum and the tether 130 is wound onto the drum over the perch panel 160. In this manner as the tether 130 is wound onto the drum, the perch panel 130 will always face the aerial vehicle 120 and be in position to receive the peg 128 on the fuselage 124 of the aerial vehicle 120. In fact, the drum could be positioned on the perch platform 172 such that the tether 130 (or center tether bridle 132b) extends over the bottom of the groove 164 of the perch panel 160.

3. PRIOR TAIL ASSEMBLY DESIGN

Figure 5:
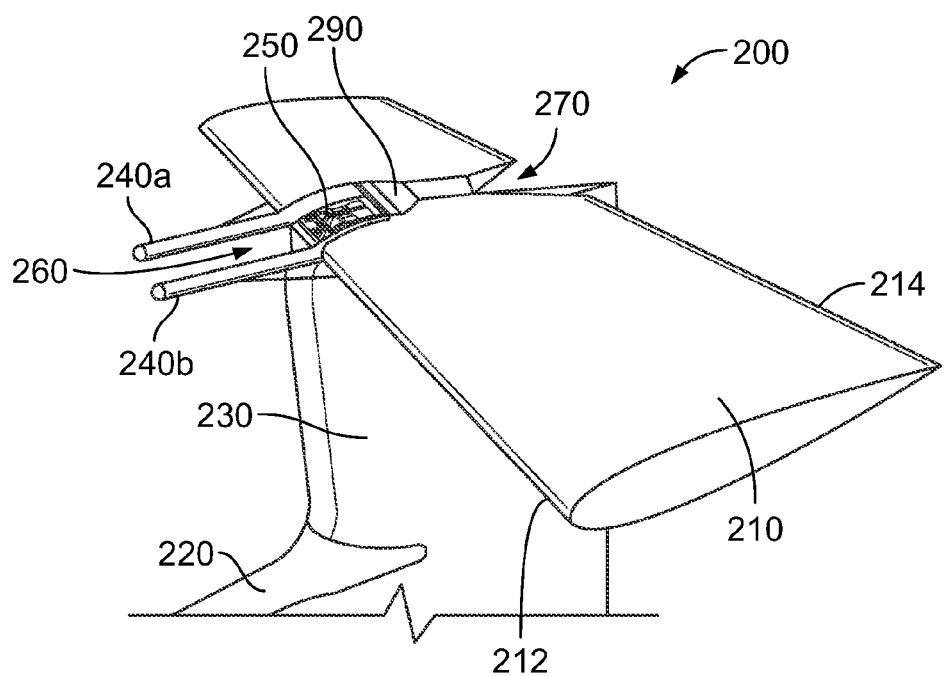
FIG. 5 is a perspective view of tail assembly 200 of a prior design with rear elevator 210 positioned in a flying mode, according to an example embodiment.
Figure 6:
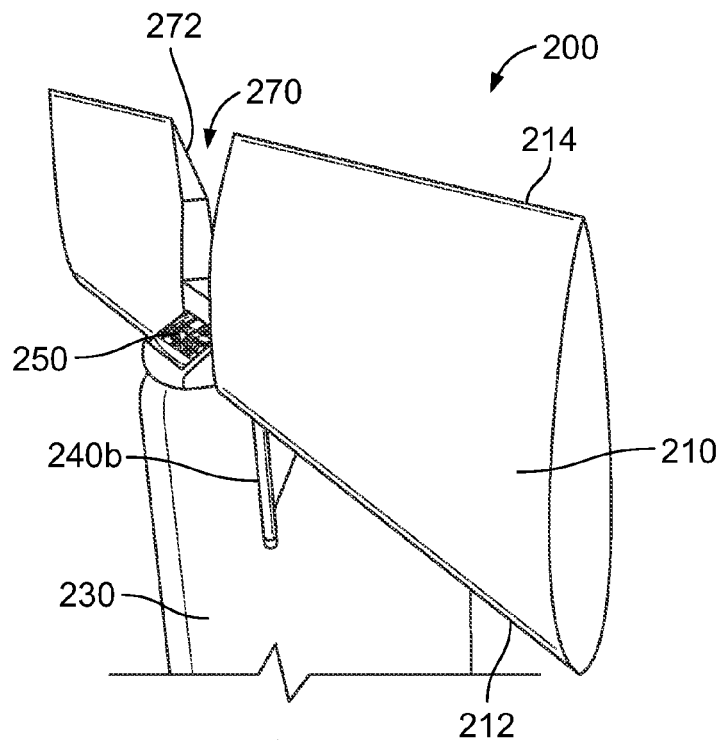
FIG. 6 is a perspective view of tail assembly 200 shown in FIG. 5 with rear elevator 210 positioned in a hover mode, according to an example embodiment.

FIGS. 5-8 disclose the design of a prior tail assembly 200 having a rear elevator 210. FIG. 5 is a perspective view of tail assembly 200 of the prior design with rear elevator 210 positioned in a flying mode. FIG. 6 is a perspective view of tail assembly 200 shown in FIG. 5 with rear elevator 210 positioned in a hover mode. In the prior design, the main spar of the rear elevator was positioned behind the rotating actuators.

In FIG. 5, rear elevator 210 has a leading edge that faces towards the main wing of the aerial vehicle when positioned in a flying mode. The rear elevator 210 is secured to a support structure 230 extending upwardly from fuselage 220 of the aerial vehicle. In particular, the rear elevator 210 is attached to a servo motor assembly 250 that is secured to the top of support structure 230. There is a large cutout 260 in the leading edge 212 of the rear elevator 210 in front of the main spar 290 of the rear elevator and positioned between forwardly extending counterweights 240a and 240b. The large cutout 260 was required so that the support structure 230 and servo motor assembly 250 would not interfere with the rear elevator 210 when moving into or out of a hover mode (shown in FIG. 6).

In the prior tail assembly 200, the rear elevator 210 had a center of aerodynamic force where the servo motor assembly 250 was located. However, the spar 290 of the rear elevator 210 carries beam and torsion load across the middle of the rear elevator, with the spar 290 being located behind the servo motor assembly 250. As a result, there was a problem with the inertial balancing of the rear elevator 210. Because a major part of the mass of the rear elevator 210 was in the spar structure, the center of mass of the rear elevator 210 was positioned behind the center of rotation. When the aerial vehicle experienced an upward perturbation during flight, the inertia of the rear elevator 210 could tilt it upwards causing a positive feedback loop of pitch oscillations would adversely affected control of the aerial vehicle. As a result, counterweights 240a and 240b (shown most clearly in FIG. 7) were provided that extend forwardly from the leading edge 212 of the rear elevator 210 to move the center of mass of the rear elevator 210 closer to the center of rotation of the rear elevator 210.

Figure 7:
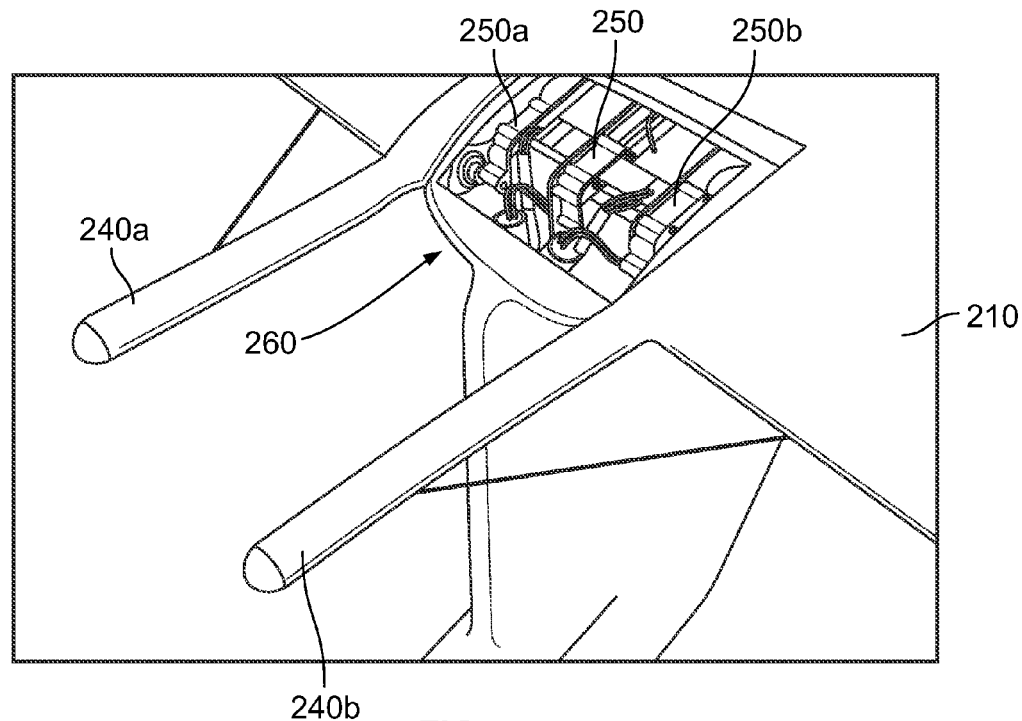
FIG. 7 is a close up front perspective view of rear elevator 210 shown in FIGS. 5 and 6.

As shown in FIG. 7, the counterweights 240a and 240b extend from the leading edge of rear elevator 210 and the square-shaped cutout 260 in the front of rear elevator 210 extends between counterweights 240a and 240b and about servo motor assembly 250, with rotating actuators 250a and 250b being attached to rear elevator 210 in front of the spar of the rear elevator 210.

Figure 8:
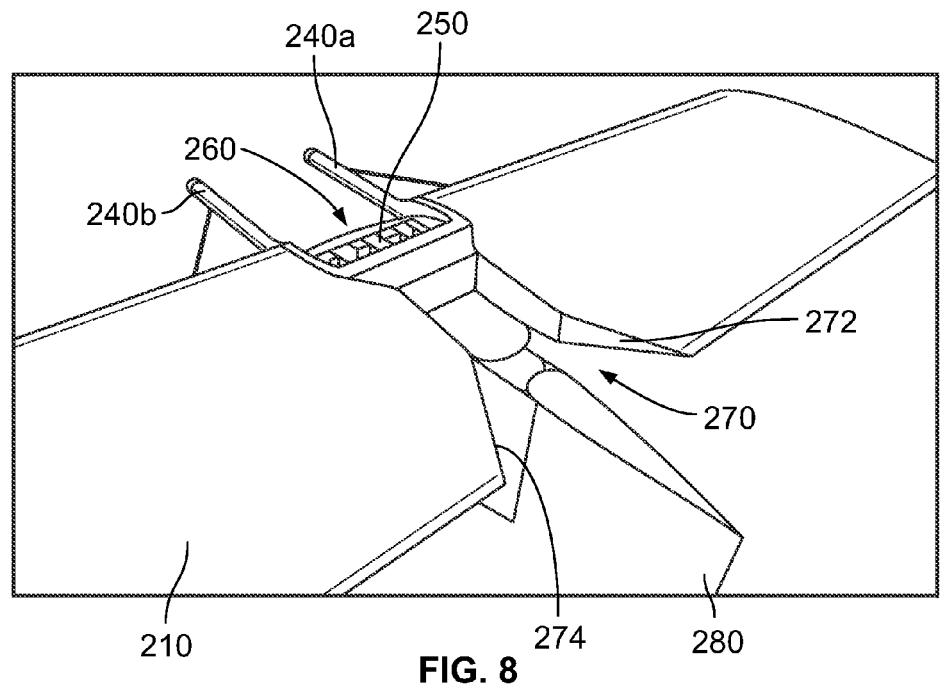
FIG. 8 is a close up rear perspective view of rear elevator 210 shown in FIGS. 5-7.

As shown in FIG. 8, a large box-like cutout 270 was also positioned behind the spar of the rear elevator 210 so that the top portion of the support structure 230 would not interfere with the rear elevator 210 when moving into or out of hover mode. Furthermore, the rear cutout 270 also had to be widened to accommodate movement of the top of the rudder 280 so that there would be no interference between the rear elevator 210 and the rudder during movement of the rudder 280. In particular, additional cutouts 272 and 274 were included on trailing edge 214 of the rear elevator 210.

As noted above, the prior tail assembly design 200 shown in FIGS. 4-8 included a number of drawbacks including the undesirable added weight of the counterweights 240a and 240b, and the aerodynamic inefficiencies caused by both the large cutout 260 in the leading edge 212 of the rear elevator 210 in front of the main spar 290 and the large cutout 270 behind the main spar 290 to eliminate interference from the support structure 230 and the rudder 280.

4. IMPROVED REAR ELEVATOR DESIGN

Figure 9:
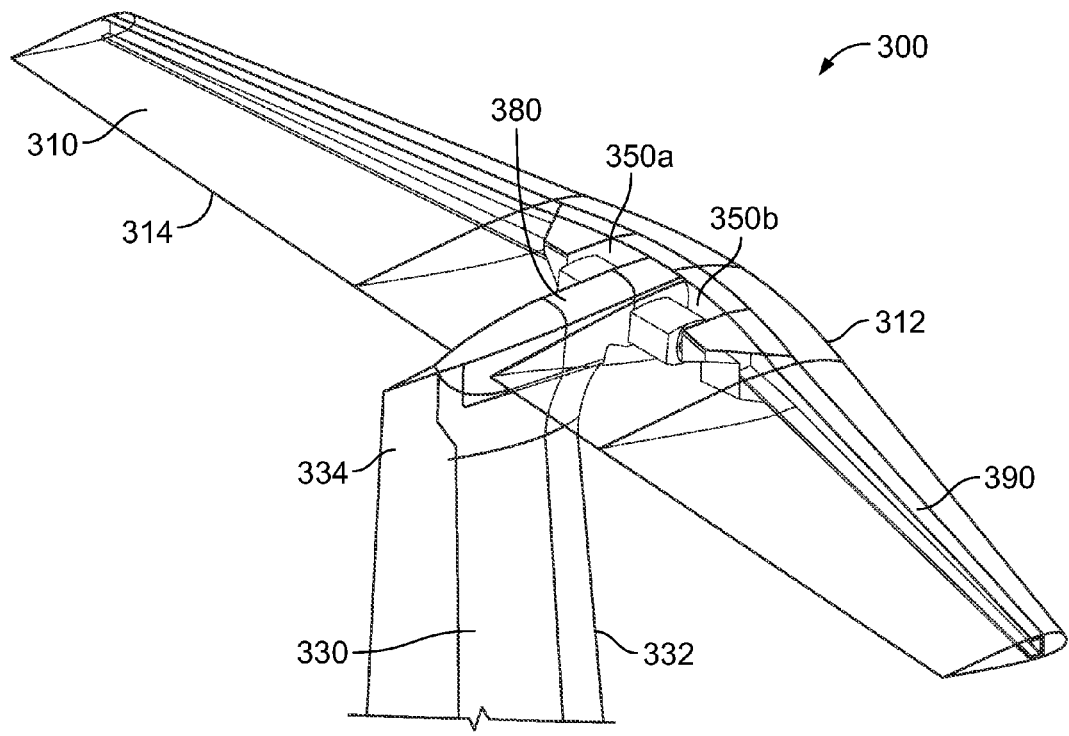
FIG. 9 shows a rear perspective view of tail assembly 300, having rear elevator 310 positioned in a flying mode, according to an example embodiment.
Figure 10:
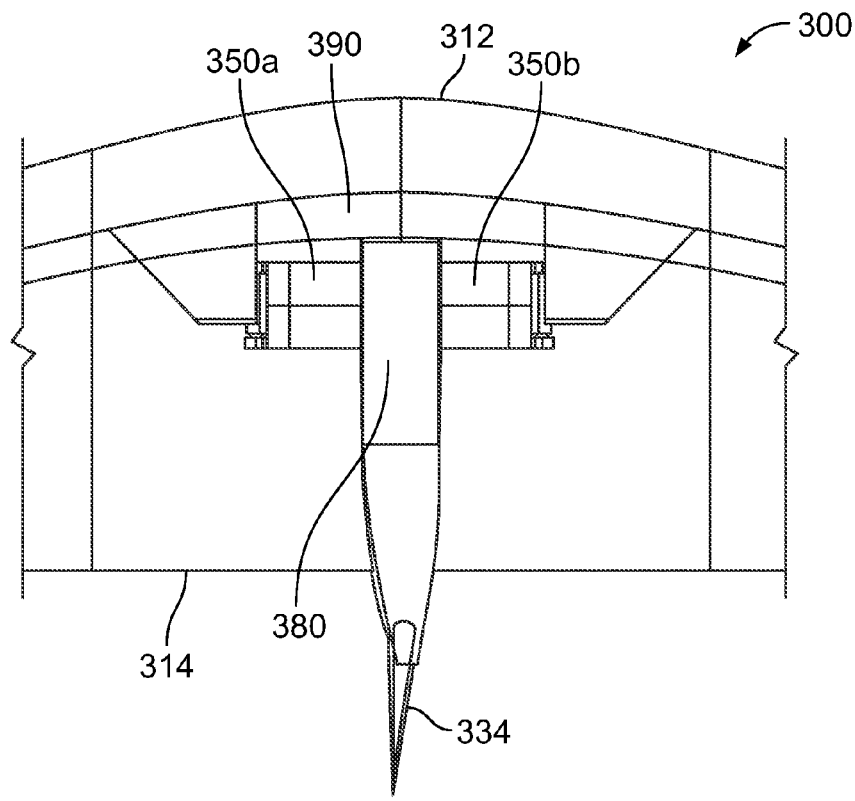
FIG. 10 is a top view of tail assembly 300 shown in FIG. 9.
Figure 11:
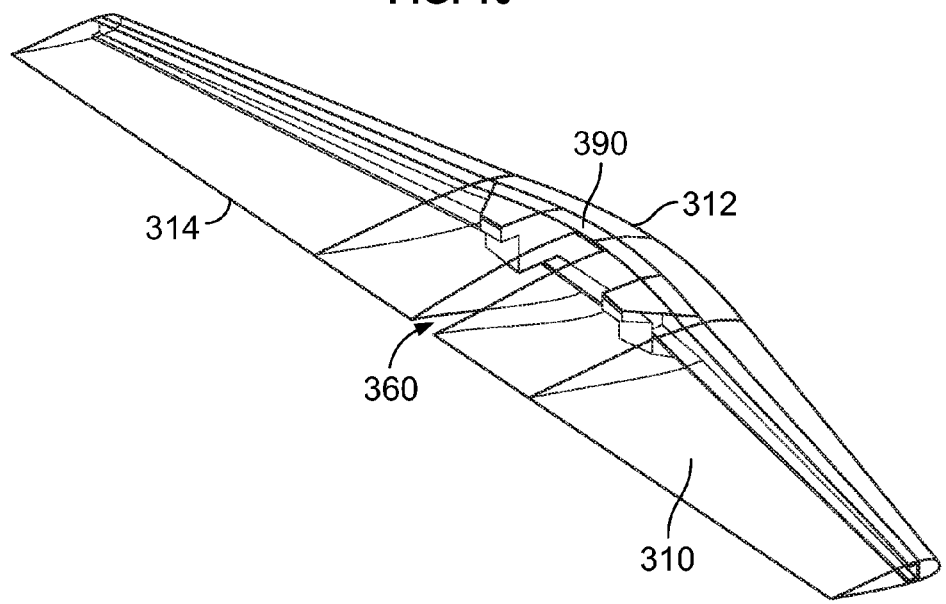
FIG. 11 is a rear perspective view of rear elevator 310 shown in FIGS. 9 and 10.
Figure 12:
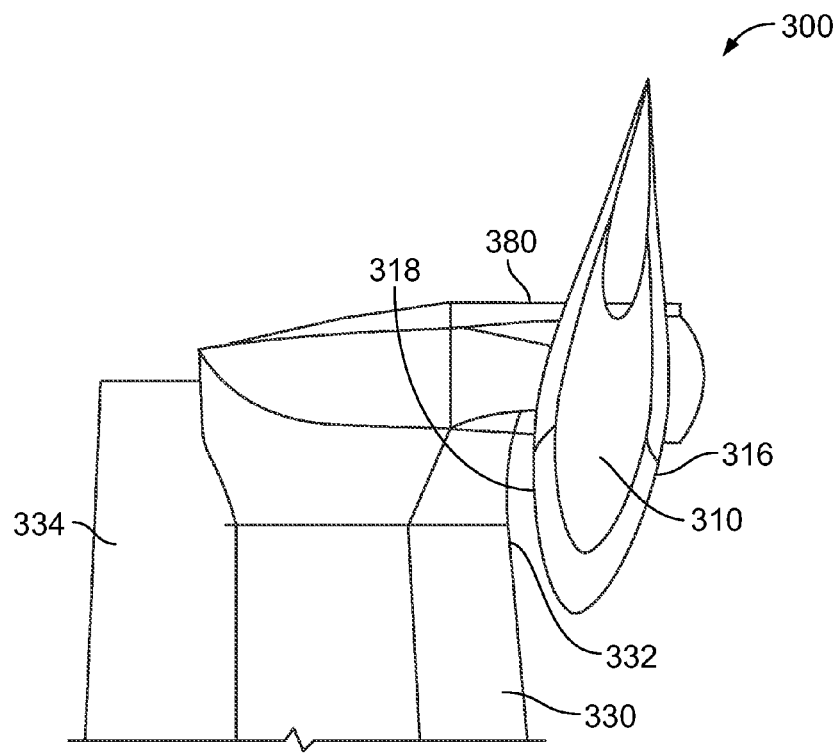
FIG. 12 is a side view of tail assembly 300 shown in FIGS. 9 and 10, with rear elevator 310 positioned in a hover mode, according to an example embodiment.

The present embodiments are directed to a tail assembly 300 shown in FIGS. 9-15, that could be used on an aerial vehicle, such as aerial vehicle 20 shown in FIGS. 1 and 2 and aerial vehicle 120 shown in FIGS. 3 and 4. Tail assembly 300 shown in FIGS. 9-15 advantageously eliminates and/or reduces the drawbacks associated with the prior tail assembly design 200 shown in FIGS. 5-8. FIG. 9-11 are shown in semi-transparent views illustrating referenced components. Other structural and/or operational components may be present.

In particular, the tail assembly 300 includes a support structure 330 upwardly extending from a rear of the fuselage of the aerial vehicle. The support structure 330 includes a front surface 332 that faces the main wing of the aerial vehicle. An overhang 380 extends from the top of the support structure 330 extending in a direction generally towards the main wing of the aerial vehicle. A pair of rotating actuators 350a and 350b are secured to the overhang 380. The rotating actuators may be, for example, servo motors (as illustrated), or bearing systems and hydraulic linear actuators, or other means for rotating the elevator. In this embodiment, the rotating actuators 350a and 350b are also attached to the rear elevator 310 in a hollow portion of the rear elevator 310 at a position that is behind the main spar 390 of the rear elevator 310. The rear elevator has a leading edge 312 and a trailing edge 314, and a rudder 334 is positioned on the rear of the support structure 330.

FIG. 10 is a top view of tail assembly 300 shown in FIG. 9. The main spar 390 is positioned in front of the rotating actuators 350a and 350b that are mounted on a forward end of overhang 380. With this embodiment, with the rear elevator 310 in a normal flying mode position shown in FIGS. 9 and 10, the leading edge 312 extends in front of the forward end of overhang 380 and in front of the front surface 332 of support structure 330. FIG. 11 is a rear perspective view of rear elevator 310 shown in FIGS. 9 and 10. Because rear elevator 310 is mounted to the rotating actuators 350a and 350b that are secured to overhang 390, there is no cutout required in the leading edge 312 of the rear elevator, allowing the leading edge to extend continuously from one end of rear elevator 310 to the other.

This configuration advantageously allows the leading edge 312 of the rear elevator 310 to extend continuously from one end of the rear elevator 310 to the other, because no front cutout in the leading edge 312 of the rear elevator 310 is needed to accommodate for interference with the support structure 330 or the rotating actuators 350a and 350b when the rear elevator 310 transitions to and from a hover mode. A continuously extending leading edge 312 on the rear elevator 310 provides significant improvements in the aerodynamics of the rear elevator in comparison to prior tail assembly design 200 where the front surface had a large cutout to provide clearance from the support structure and rotating actuators.

Furthermore, in the design of tail assembly 300 with the rear elevator 310 attached to the rotating actuators 350a and 350b behind the spar 390, the center of mass of the rear elevator 310 may be more closely aligned with the center of rotation of the rear elevator 310, thereby eliminating the need for counterweights, which require additional material and manufacturing cost as well as undesirable additional weight. In some embodiments, the center of mass of the rear elevator 310 may be within 4 inches or less from the center of rotation at the center portion of the rear elevator 310 where the rear elevator 310 is attached to the rotating actuators 350a and 350b. By aligning the center of mass with the center of rotation, less torque is required to rotate the rear elevator 310 and may result in the ability to provide rotating actuators of a reduced size or capacity.

Moreover, in the present embodiments, the rotating actuators 350a and 350b are positioned behind the spar 390, and a rotation point of the rotating actuators 350a and 350b may be advantageously placed at the aerodynamic center so that forces on the rotating actuators 350a and 350b are low. In some embodiments, the aerodynamic center of the rear elevator 310 may be within 4 inches or less from the center of rotation at the center portion of the rear elevator 310 where the rear elevator 310 is attached to the rotating actuators 350a and 350b. By aligning the aerodynamic center with the center of rotation, less torque is required to rotate the rear elevator 310 which may also result in the ability to provide rotating actuators of a reduced size or capacity.

In addition, as shown in FIGS. 9 and 10, because the rear elevator 310 is mounted on overhang 380 that extends forwardly from support structure 330, the trailing edge 314 of the rear elevator 310 may be positioned in front of the rudder 334. Therefore, unlike the design of prior tail assembly 200 shown in FIGS. 5-8, there is no need to provide additional cutouts to provide clearance from the rudder 334. In fact, as shown in FIG. 11, there is a rear cutout 360 in the trailing edge 314 of rear elevator 310. However, the cutout 360 may be shaped to closely conform to the outer surfaces of the overhang 380 and/or support structure 330. When the aerial vehicle is the flying mode, in some applications small gaps of an inch of less may exist between the cutout 360 and the outer surfaces of the overhang 380 and support structure 330.

Figure 13:
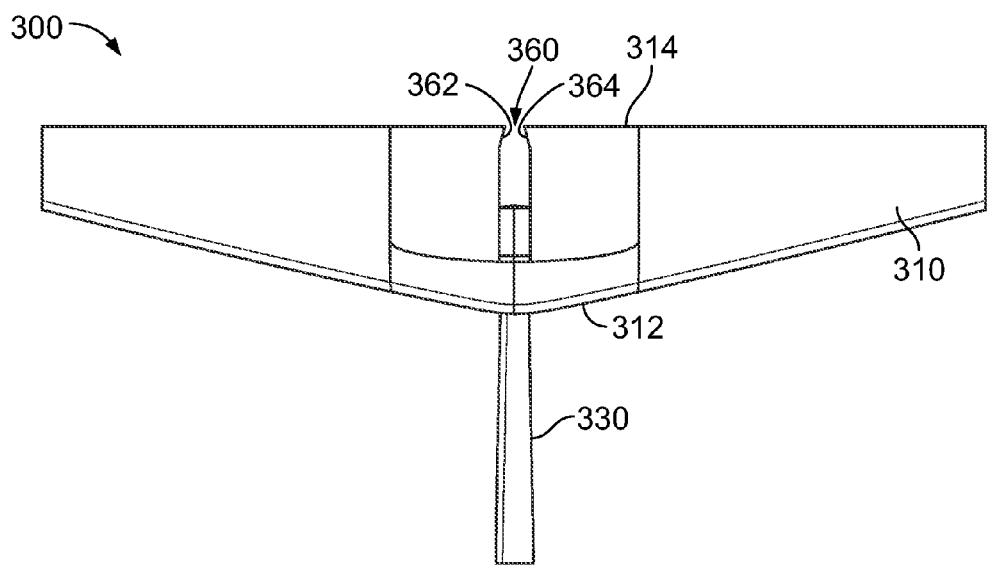
FIG. 13 is a front view of the tail assembly 300 shown in FIG. 12.
Figure 14:
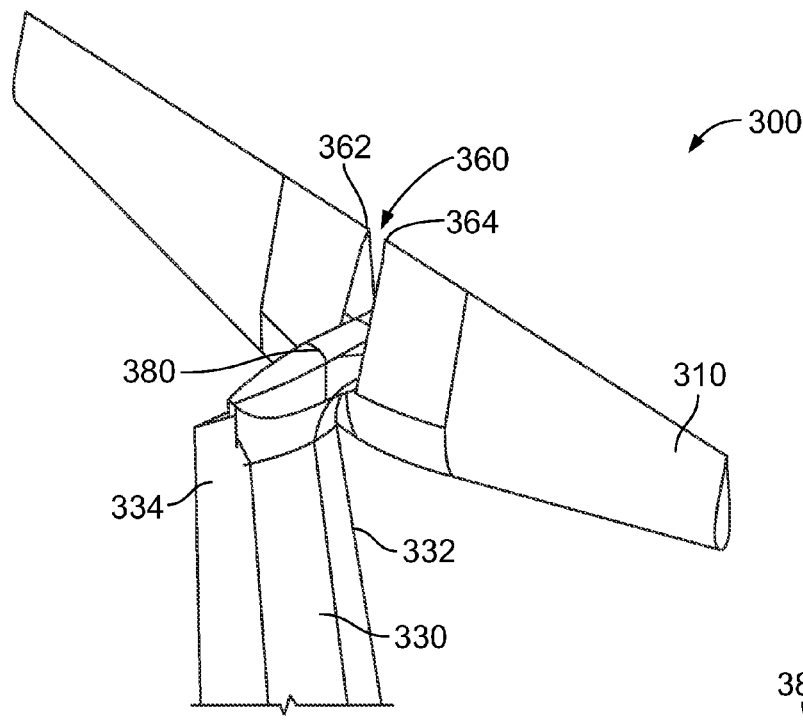
FIG. 14 is a rear perspective view of tail assembly 300 shown in FIGS. 12 and 13.
Figure 15:
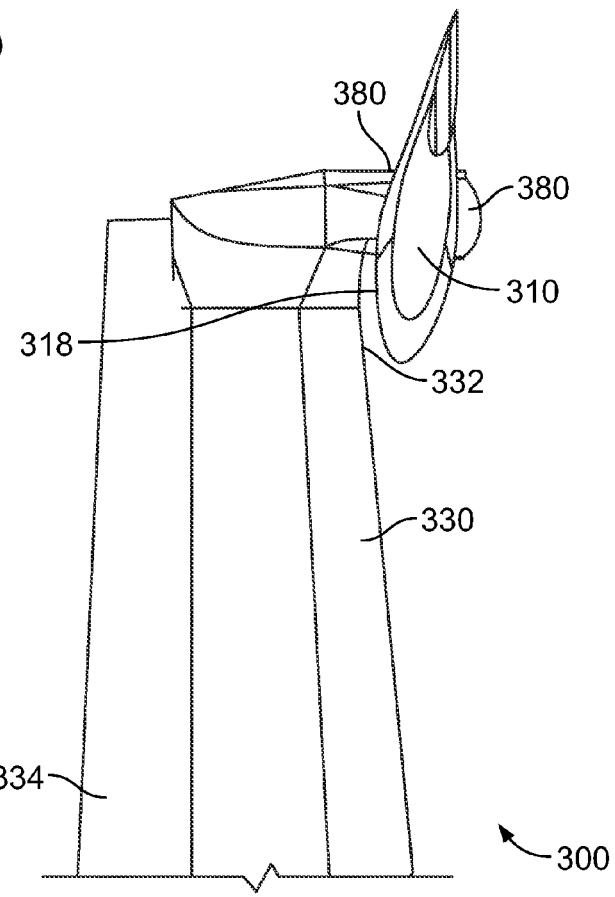
FIG. 15 is a side view of tail assembly 300 shown in FIGS. 12-14.

In other applications, the use of small gaps (in some cases even greater than one inch) between the rear elevator and support structure and/or overhang allows the rear elevator and the support structure to be effectively aerodynamically sealed. During flying mode, the rear elevator 310 has normal flight deflections of +/−15 degrees and the gaps may remain essentially closed and therefore may not disrupt attached air flow. As a result, the tail assembly 300 provides significant aerodynamic improvements in normal flying mode over the prior design with the large square cutout that was open even during normal flying mode. In fact, as can be seen in FIGS. 13 and 14, the rear cutout may actually have inwardly angled surfaces 362 and 364 at the trailing edge 314 of the rear elevator to allow the cutout 360 to closely conform to the outer surfaces of the overhang 380 and support structure 330, a significant aerodynamic improvement over the additional cutouts required in the prior tail assembly design 200 shown in FIGS. 5-8 (see 272 and 274 in FIG. 8).

FIGS. 12-15 show tail assembly 300 with the rear elevator 310 in a hover mode position, rotated approximately 90 degrees from the flight mode position illustrated in FIG. 9. The positioning of the rotating actuators 350a and the 350b on the overhang 380 of the support structure 330 advantageously provides for no interference between the rear elevator 210 and the support structure 330 when the rear elevator 310 transitions to and from hover mode. In particular, when the rear elevator 310 is rotated into hover mode position, both of the main surfaces 318 and 316 of the rear elevator 310 are positioned in front of the front surface 332 of the support structure 330. Therefore, there is no interference between the support structure 330 and the rear elevator 310 because it is attached to the overhang 380 positioned over the front of the support structure 330.

Moreover, because the overhang 380 extends in front of the support structure 330 and rudder 334 attached at the rear of the support structure 330, the trailing edge 314 of the rear elevator 310 is positioned in front of the rudder 334. Therefore, there is no need to provide any additional cutouts in the rear cutout 360 to provide clearance from movement of the rudder 334. As a result, the entire rear cutout 360 can closely conform to the outer surfaces of the overhang 380 and support structure 330. Providing a rear cutout 360 that closely conforms to the outer surfaces of the overhang 380 and the support structure 330 provides for improved aerodynamics during normal flying mode. Although the rear cutout 360 will be exposed during hover mode, the aerodynamic efficiency of the aerial vehicle is much more important during flying mode where the rear cutout is not exposed.

The present embodiments of the tail assembly 300 shown in FIGS. 9-15 include significant advantages over the prior tail assembly design 200 shown in FIGS. 5-8 including the following:

1. Attaching the rear elevator to the rotating actuators with the main spar positioned in front of the rotating actuators. This configuration allows for the center of mass of the rear elevator to be closely aligned with the center of rotation of the rear elevator, thereby reducing inertial balance issues and eliminating the need for counterweights.

2. Providing an overhang extending forwardly from the top of the support structure provides clearance from the support structure so that the leading edge of the rear elevator may be provided with a continuous surface extending from one end of the rear elevator to the other. A continuous leading edge with no front cutout provides significant aerodynamic improvement over designs having a front cutout to provide clearance from a support structure.

3. Providing a rear cutout that closely conforms to the outer surfaces of the overhang and the support structure with minimal gaps therebetween provides significant aerodynamic improvement over designs having a large, boxy rear cutout.

4. Positioning the rear elevator so that the trailing edge of the rear elevator is in front of the rudder eliminates the need to accommodate rudder movement with further cutouts in the rear cutout and provides for more aerodynamic flight characteristics in flying mode.

It will be appreciated that when the relative positions of the tail assembly are described or claimed, the term "in front of" means closer to the main wing when viewed from the top. Similarly, the term "behind" means further from the main wing when viewed from the top and/or closer to a trailing edge, as context permits. Further, where it is stated that the trailing edge of the rear elevator is "in front of" the rudder, that means that the trailing edge of the rear elevator near the rudder is closer to the main wing than the moving portion of the rudder. Also, where it is stated that the major surfaces of the rear elevator are "in front of" the front surface of the support structure, that means that the major surfaces of the rear elevator in front of the support structure are closer to the main wing than the front surface of the support structure. Finally, where it is stated that the leading edge of the rear elevator remains "in front of" the front surface of the support structure, that means the leading edge of the rear elevator in front of the support structure is closer to the main wing than the front surface of the support structure.

5. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An aerial vehicle, comprising:
   a fuselage;
   a main wing attached to the fuselage;
   a support structure extending upwardly from the fuselage, the support structure having a leading surface facing towards the main wing;
   an overhang positioned on a top of the support structure and extending towards the main wing beyond the leading surface of the support structure such that the overhang is positioned above the fuselage;
   one or more rotating actuators positioned on the overhang;
   a rear elevator having a leading edge and a trailing edge and having a first major surface disposed opposite of a second major surface, the rear elevator attached to the one or more rotating actuators;
   wherein the one or more rotating actuators are configured to move the rear elevator from a flying mode position where the leading edge of the rear elevator faces the main wing to a hover mode position where the first major surface of the rear elevator faces the main wing; and
   wherein the first and second major surfaces of the rear elevator are positioned in front of the leading surface of the support structure when the rear elevator is in the hover mode position.

2. The aerial vehicle of claim 1, wherein the leading edge of the rear elevator extends continuously from a first end of the rear elevator to a second end of the rear elevator.

3. The aerial vehicle of claim 1, wherein the rear elevator has a main spar and the rear elevator is attached to one or more rotating actuators at a position behind the main spar.

4. An aerial vehicle, comprising:
   a fuselage;
   a main wing attached to the fuselage;
   a support structure extending upwardly from the fuselage, the support structure having a front surface facing the main wing;
   an overhang positioned on a top of the support structure and extending towards the main wing;
   one or more rotating actuators positioned on the overhang;
   a rear elevator having a leading edge and a trailing edge and having a first major surface disposed opposite of a second major surface, the rear elevator attached to the one or more rotating actuators;
   wherein the one or more rotating actuators are configured to move the rear elevator from a flying mode position where the leading edge of the rear elevator faces the main wing to a hover mode position where the first major surface of the rear elevator faces the main wing;
   wherein the first and second major surfaces of the rear elevator are positioned in front of the front surface of the support structure when the rear elevator is in the hover mode position; and
   wherein the rear elevator has a rear cutout positioned behind the one or more rotating actuators that conforms to outer surfaces of the overhang when the rear elevator is in the flying mode, and wherein gaps of one inch or less exist between the rear cutout and outer surface of the overhang when the rear elevator is deflected +/−15 degrees in the flying mode position.

5. The aerial vehicle of claim 1, wherein the trailing edge of the rear elevator is positioned in front of a rudder located on the support structure.

6. The aerial vehicle of claim 1, wherein an aerodynamic center of the rear elevator is aligned within 4 inches of a center of rotation of the rear elevator.

7. The aerial vehicle of claim 4, wherein the rear cutout includes inwardly angled surfaces at the trailing edge of the rear elevator.

8. The aerial vehicle of claim 1, wherein a center of mass of the rear elevator is aligned within 4 inches of a center of rotation of the rear elevator at a center of the rear elevator where the rear elevator is attached to the one or more rotating actuators.

* * * * *